United States Patent Office 2,947,752
Patented Aug. 2, 1960

2,947,752
8-AMINOCOCAINIUM COMPOUNDS

Bernard Rudner, Pittsburgh, Pa., and Aristotle G. Prapas, Baltimore, Md., assignors to W. R. Grace & Co., New York, N.Y., a corporation of Connecticut No Drawing. Filed Feb. 4, 1959, Ser. No. 791,012

6 Claims. (Cl. 260—292)

This invention relates to derivatives of naturally occurring and synthetic alkaloids. In one specific aspect, it relates to a new class of physiologically active quaternized hydrazinium salts, the chloramine adducts of cocaine and its derivatives.

Oxygenated derivatives of tropane occur in nature in the roots and leaves of solanaceous plants, for example, in the *Atropa belladonna,* henbane and thornapple. *Atropa belladonna,* frequently referred to as nightshade, contains the alkaloid hyoscyamine, $C_{17}H_{23}NO_3$. Hyoscyamine, a useful pharmaceutical, racemizes rapidly in the presence of dilute alkalies or slowly on standing into atropine, likewise a useful pharmaceutical. When heated in the presence of a base atropine splits into the secondary alcohol, tropine, and the acid, tropic acid. Tropine is a tertiary base as well as an alcohol, and tropic acid is an aromatic hydroxy-acid. See Equation 1 below.

(1)
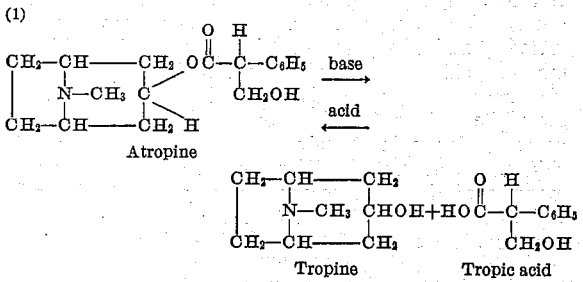
Atropine

Tropine     Tropic acid

The chemical nucleus of the tropine molecule is the ethylene bridged N-methylpiperidine ring. Or phrasing it another way, the heterocyclic portion of the molecule consists of a piperidine ring and a pyrrolidine ring having two carbon atoms and a nitrogen in common. The simplest member of this generic class is tropane. For convenience, structural formulas are given as if these compounds were planar; actually the two fused heterocyclic rings are not coplanar.

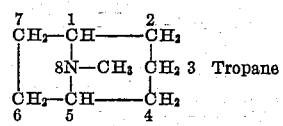
Tropane

Many of the simple derivatives of tropane exist in various stereoisomeric forms. Substitution may generate asymmetric carbon atoms and optical activity can result. The maximum number of optical isomers theoretically possible is $2^n$ where $n$ is the number of asymmetric carbon atoms. Not all of the possible isomers exist because of the geometric requirements of fused ring systems. There are two 3-hydroxytropanes, tropine and pseudotropine, which differ only in the cis or trans location of the hydroxyl substituent with respect to the N-methyl group. Tropine and pseudotropine each have a plane of symmetry and are consequently optically inactive despite the fact they contain a carbon atom with four different substituents. When tropine is esterified with dl-tropic acid, the product is atropine. This reaction is the reverse of the hydrolysis shown in Equation 1 above.

Another common tropane derivative, cocaine, is obtained from the leaves of the coca shrub in Peru and Java. Cocaine is a local anesthetic, especially used in eye, nose and throat surgery. Because of its rather high toxicity and habit-forming properties, it has been replaced in some of its uses by such synthetic local anesthetics as procaine and butyn. Cocaine melts at 98° C.; it is crystalline and levorotatory. It is a diester of levoecgonine as shown below in Equation 2.

(2)
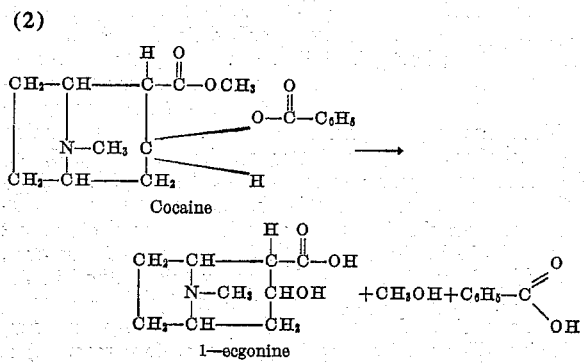
Cocaine

1—ecgonine

By treating cocaine and its derivatives with chloramine, we have discovered a new class of hydrazinum salts having local anesthetic properties combined with mitigated toxicity.

It is, therefore, an object of the present invention to provide a new generic class of hydrazinium salts useful as local anesthetics and as pharmaceutical intermediates. This application is a continuation-in-part of our co-pending application Serial No. 689,779, filed on October 14, 1957, now U.S. Patent No. 2,893,996.

In accordance with the present invention, we have discovered a generic class of hydrazinium compounds corresponding to the formula:

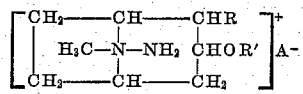

In the above formula, R may be carboxy or carbolower-alkoxy. R' is aroyl or hydrogen. Suitable aroyl groups include cinnamoyl, isoatropyl, benzoyl and lower alkyl and halo substituted benzoyl. $A^-$ is a pharmaceutically acceptable anion. The primary attributes of such an anion are non-toxicity and pharmaceutical compatibility. Otherwise, the choice of the anion $A^-$ is of little consequence, since the primary activity of our novel compounds resides in the cation. The salts obtained through the variation of $A^-$ may in some cases have special advantages due to solubility, ease of crystallization, lack of objectionable taste and the like, but these considerations are all subsidiary to the characteristics of the cation which are independent of the character of $A^-$. Hence all variations of $A^-$ are considered equivalent for the purposes of the present invention.

Specific, but nonlimiting, variants of the anion $A^-$ are as follows: chloride, bromide, iodide, sulfate, bisulfate, acetate, salicylate, valerate, oleate, phenate, laurate, borate, benzoate, lactate, nitrate, diglycollate, phosphate, imino-tris-acetate, phenylethylbarbiturate, acid phosphate, o-acetoxybenzoate, citrate, diallylbarbiturate, sulfathiazole, theophyllinate, urate, adipate, maleate, fumarate, succinate, tartrate, diethylbarbiturate, penicillinate, guaiacolsulfonate, methylene-bis-cresotinate, camphorate, salicylamide, diphenylhydantoin, carbonate, cacodylate, aconitate, polymethacrylate, poly(styrenesulfonate), phytate, sulfamate, gentisate, malate and the like.

In preparing the compounds of the present invention, it is usually suitable to contact chloramine with a solution of the basic cocaine derivative, allow the reaction to proceed until the desired quantity of chloramine is consumed, and then isolate and purify the resultant hydrazinium chloride by standard laboratory techniques. While chloramine is most advantageously prepared in a form of a gaseous chloramine-ammonia-nitrogen stream obtained from a generator constructed according to the teachings of Sisler et al., U.S. Patent 2,710,248, other methods are equally adaptable for the purposes of the present invention. For instance, chloramine can be made by reacting chlorine with an excess of ammonia in carbon tetrachloride solution or similar halogenated hydrocarbon solvent under controlled conditions of mixing at low temperatures. Such a procedure is fully described in U.S. Patent No. 2,678,258, to John F. Haller. Another effective procedure is that of Coleman et al. fully described in "Inorganic Syntheses," vol. I, 59 (1939). Alternatively, the chloramine can be formed in the presence of the amine as described in my copending application S.N. 605,230, filed August 20, 1956, which teaches the reaction of chlorine and a tertiary amine in the presence of excess ammonia. For simplicity, when both the base and product are soluble in the same inert solvent, e.g., chloroform, we may form chloramine in situ by this method in the solution containing the tropane derivative.

The choice of solvent is one of economy and simplicity. For good absorption (and therefore reaction) it is desirable to bubble chloramine through a long column of a solution comprising the cocaine derivative dissolved in a relatively cheap inert solvent. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene, and chlorobenzene; nitroaromatics, e.g., nitrobenzene. For special purposes, water and other hydroxylic solvents such as ethanol and Cellosolve may be used.

Cocaine derivatives suitable for chloramination include, but are not limited to, the following: ecgonine, benzoylecgonine, cinnamoylcocaine, truxilline, tropacocaine, pseudococaine, isococaine, and the like. It should be further noted that for purposes of the present invention the above compounds can be used directly or as mixtures. Natural mixtures may be chloraminated as such; for example, the extract of Javanese leaves of erythroxylon coca which contains cocaine, benzoylecgonine, methylecgonine, truxillococaine and cocamine.

It is obvious that chloramination gives only the chloride derivative. To provide the other useful cocaine hydrazinium salts of the present invention, it is necessary to prepare salts of other anions by metathesis. It is possible to make mixed anion salts by adding, for example, the cocaine chloramine adduct to a standard sulfa mixture, e.g., sulfamerzine, sulfamethazine and sulfadiazine to obtain a mixture of the three salts. Many of the anions described supra can be obtained by mixing aqueous solutions of the hydrazinium chloride with appropriate reagents. More often than not, the desired product precipitates directly as the reaction progresses. Certain of the organic salts can be more conveniently made in aqueous alcohol solutions or in other polar solvents. Chloroform is particularly suitable for preparing stearates and other fatty acid derivatives. In fact, it is possible to carry out certain metathetical reactions in the absence of any solvent at all. The method chosen is naturally dependent on the physical properties of the desired salt. When it is necessary to prepare a very soluble salt, the reaction of the hydrazinium hydroxide with the appropriate acid may be utilized. Subjecting a hydrazinium halide to the action of moist silver oxide will give the hydroxide.

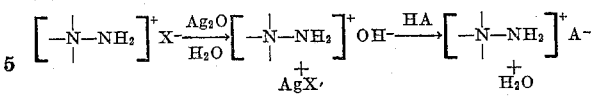

The scope and utility of the present invention is further illustrated by the following examples:

Example I

A chloramine generator was constructed according to the teachings of Sisler et al., supra. The generator consists of a horizontal Erlenmeyer flask, the bottom of which contains an outlet tube which is directed into the reactor containing a solution of alkaloid. Ammonia and chlorine (which may be diluted with nitrogen) are introduced separately into the top of the flask through concentric conduits, the inner tube carrying the chlorine. Chloramine and ammonium chloride are formed in the flask at the point where the chlorine and ammonia vapors come into contact. A rod is provided in the chlorine inlet stream to prevent any plugging of that stream with ammonium chloride. The outlet end of the flask is masked with glass wool to collect any ammonium chloride particles which otherwise would be carried into the reactor. The chloramine yield for any one set of gas flow meter readings is determined by removing the reactor and passing the filtered chloramine stream directly into a series of three chilled traps. Under the conditions of chloramine generation, only ammonia, chloramine, and nitrogen can pass through the glass wool into the traps. Since the traps are maintained at at least −70° C., the ammonia and chloramine condense therein and react relatively slowly (compared to the chlorine-ammonia reaction velocity) to form hydrazine, nitrogen and ammonium chloride. By allowing the low temperature condensate to come to room temperature slowly, the chloramine is converted quantitatively to nonvolatile (at 20–30° C.) ammonium chloride, while the ammonia, hydrazine and nitrogen escape by volatilization. Therefore, titration of the white residue (obtained on evaporation of the condensate) for chloride gives a direct measure of the chloramine generated. This can be related back to a measure of the chlorine used to obtain the chloramine yield. There is an alternate procedure which is suitable for use when chloramine is actually being consumed by reaction with the alkaloid. The amount of chlorine used in a run, which may be the limiting reagent quantity for yield calculation, can be measured directly, e.g., by weight of the chlorine cylinder before and after use, or by use of flow meters. The amount of ammonium chloride retained within the generator is determinable by titrating an aliquot of the aqueous solution of all of the solid remaining within the chloramine generator after the reaction has been completed. The chloramine yield, expressed as percent of the theoretical yield, can then be calculated from the formula:

$$\text{percent} = \frac{(A-B)200}{A}$$

where A is the total number of equivalents of chlorine passed into the generator and B is the number of equivalents of chloride retained within the generator. The chloride content of the generator thus serves as an indicator of the efficiency of chloramine formation.

Example II

A 26 g. portion of cocaine was dissolved in chloroform and treated with a large excess of chloramine from the generator. Analysis of the initial precipitate obtained from this reaction mixture showed the crude material to contain about 82% ammonium chloride and 18% N-aminococainium chloride (8-amino-2-carbomethoxy-3-benzoyloxytropanium chloride. Evaporation of the chloroform filtrate gave 27.7 g. of mixed unreacted base and product. The 6.1 g. of product thus obtained represented 85% conversion based on the recovered amine. Ether extraction of a small portion of the product left as an ether-insoluble residue, the relatively pure chloramine adduct, melting at about 148° C. The preparative reaction of the novel N-aminococainium chloride is shown below in Equation 3.

(3)
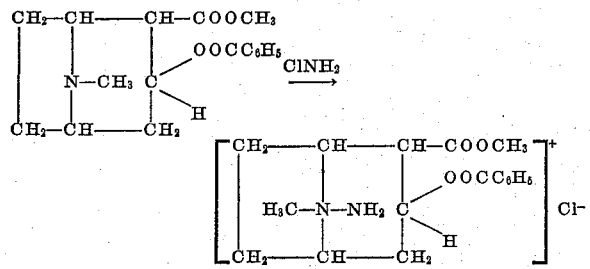

*Example III*

About 500 mg. of crude N-aminococainium chloride was boiled in 10 ml. of concentrated HCl for half an hour. Additional quantities of HCl were added as needed during the reaction. The mixture was evaporated dry, treated and evaporated dry twice with isopropyl alcohol, and extracted with ether to remove benzoic acid. The resulting material was extracted with isopropyl alcohol and the extract evaporated to dryness to give about 50 mg. of off-white N-aminoecgoninium chloride (2-carboxy-3-hydroxy-8-amino-tropanium chloride) as shown in Equation 4 below. This novel salt dehydrated at about 118–121° C., melted at about 186° C. and was soluble in water and ethanol.

(4)
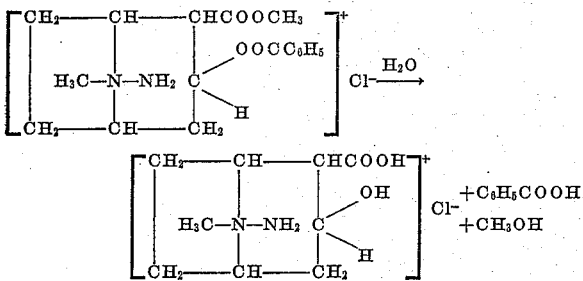

Our novel aroyl cocaine hydrazinium salts can be prepared by the reaction of the hydroxy compound of this example with an aroyl chloride according to the standard Schotten-Baumann reaction. For example, the hydroxy compound is dissolved in ice water and treated dropwise and alternately with the appropriate aroyl chloride and 20% sodium hydroxide. When the reaction is completed, the resultant insoluble aroyl hydrazinium compound is collected by filtration, washed and purified by recrystallization.

*Example IV*

A portion of the product of Example II was dissolved in water and treated with a saturated aqueous solution of picric acid. The resultant insoluble yellow picrate was collected by filtration and melted 65–67° C. Its structural formula is shown below:

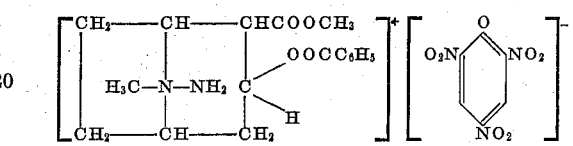

We claim:

1. Compounds having the general formula:

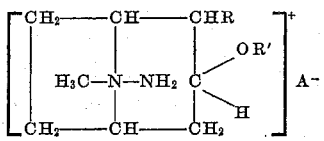

wherein R is a member selected from the group consisting of carboxy and carboloweralkoxy; R' is a member selected from the group consisting of hydrogen and monocarbocyclic aroyl; and A⁻ is a pharmaceutically acceptable anion.

2. Compounds according to claim 1 wherein R is carboxy, R' is hydrogen and A is chloride.

3. Compounds according to claim 1 wherein R is carboloweralkoxy, R' is monocarbocyclic aroyl and A is chloride.

4. 8 - amino - 2 - carbomethoxy - 3 - benzoyloxytropanium chloride.

5. 8 - amino - 2 - carbomethoxy - 3 - benzoyloxytropanium picrate.

6. 8-amino-2-carboxy-3-hydroxytropanium chloride.

No references cited.